Oct. 6, 1925.
C. S. HENTZELL ET AL
1,556,508
PLOW
Filed May 16, 1921 4 Sheets-Sheet 3
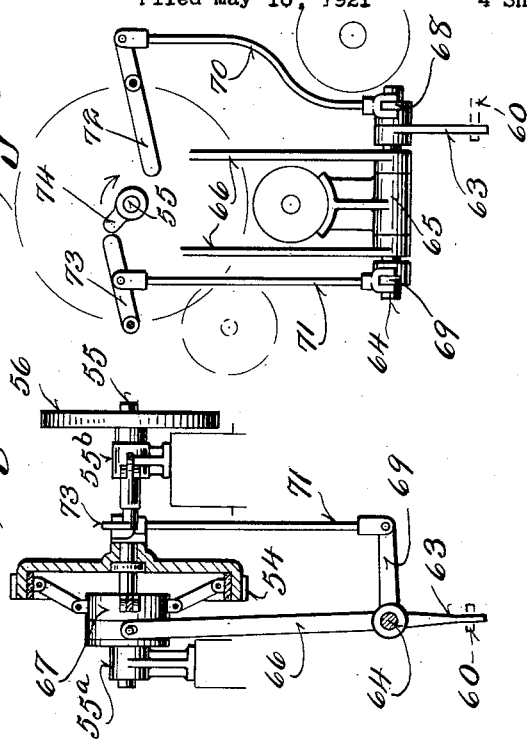
Inventors
C. S. Hentzell
M. P. Hentzell
Witness
T. P. Britt
By Young and Young
Attorneys Oct. 6, 1925.
C. S. HENTZELL ET AL
PLOW
Filed May 16, 1921        4 Sheets-Sheet 4
1,556,508
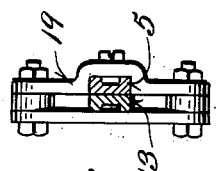
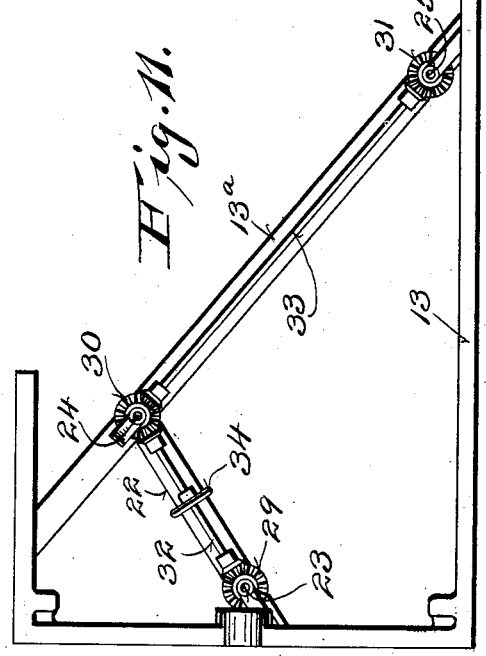
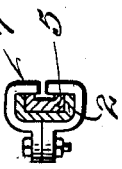
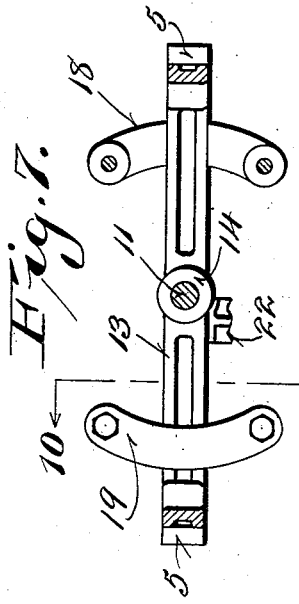
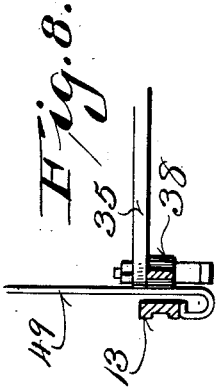
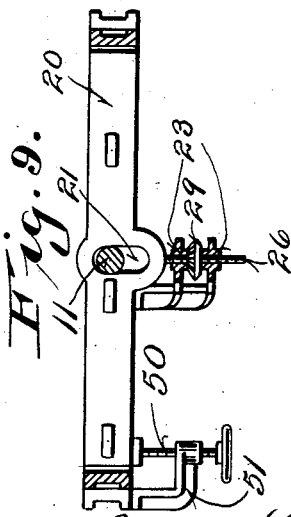
Inventors
C. S. Hentzell
M. P. Hentzell Patented Oct. 6, 1925.

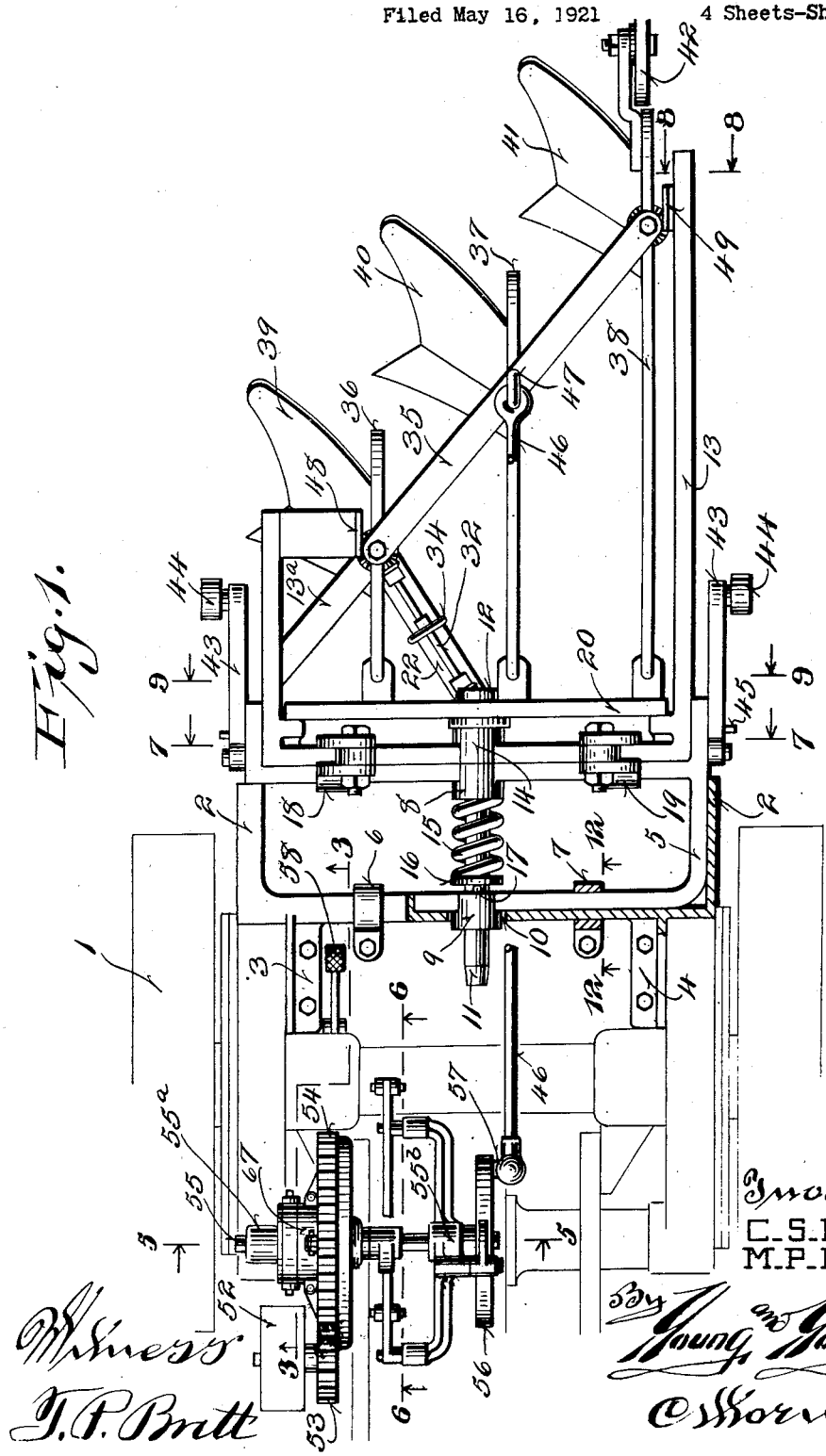

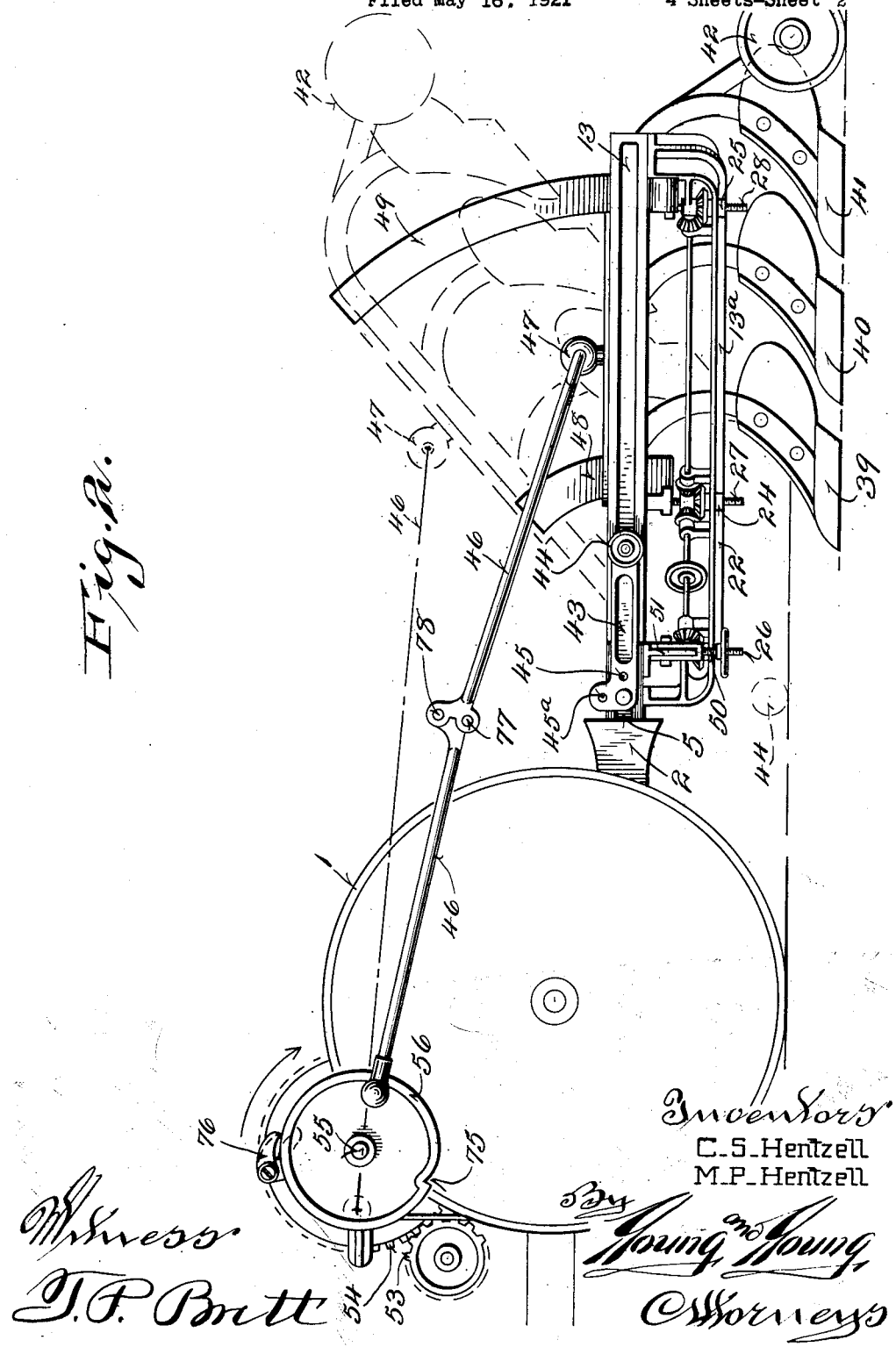

1,556,508

UNITED STATES PATENT OFFICE.

CHARLES S. HENTZELL AND MILLARD P. HENTZELL, OF MILWAUKEE, WISCONSIN, ASSIGNORS OF NINE FORTY-EIGHTHS TO GEORGE HOELCHER, OF CHICAGO, ILLINOIS, AND NINE FORTY-EIGHTHS TO CHARLES R. SMITH, OF SYRACUSE, INDIANA.

PLOW.

Application filed May 16, 1921. Serial No. 469,885.

*To all whom it may concern:*

Be it known that we, CHARLES S. HENTZELL and MILLARD P. HENTZELL, both citizens of the United States, and residents of Milwaukee, in the county of Milwaukee and State of Wisconsin, have invented certain new and useful Improvements in Plows; and we do hereby declare that the following is a full, clear, and exact description thereof.

Our invention relates to new and useful improvements in plows, and more especially to that type which is adapted to be attached to and drawn by a wheeled vehicle, preferably a tractor.

One of the important objects of the invention is to improve the structure of the connection between the plow and wheeled vehicle whereby the plow is positively held against being swung laterally by the side thrust exerted by the furrow against the moldboard.

A further object of the invention is to provide improved means for adjusting the depth of the plows, and also to provide means to compensate for the irregularities of the ground.

Another object of the invention is to provide improved means for elevating the plows out of engagement with the soil.

A still further object of the invention is to provide a compact arrangement whereby the plows will be located near the operator, thus making it easy for him to observe their operation.

With these and other objects in view which will be apparent from the following description, the invention consists in certain structural details and combination of parts, which will be more clearly understood from the following description, in which:

Figure 1 is a plan view of our invention with a portion thereof cut away to more clearly define the structural details.

Figure 2 is a side elevation of the invention.

Figure 3 is a vertical longitudinal section through a portion of the device taken on the line 3—3 of Figure 1.

Figure 4 is a view of one of the details of the invention on the line 4—4 of Figure 3.

Figure 5 is a vertical transverse section on the line 5—5 of Figure 1.

Figure 6 is a longitudinal vertical section on the line 6—6 of Figure 1.

Figure 7 is a vertical transverse sectional view substantially on the line 7—7 of Figure 1.

Figure 8 is a sectional detailed view on the line 8—8 of Figure 1.

Figure 9 is a vertical transverse sectional view on the line 9—9 of Figure 1.

Figure 10 is a detailed sectional view on the line 10—10 of Figure 7.

Figure 11 is a plan view of the plow supporting frame showing the means for adjusting the elevation of the plows, and Figure 12 is a sectional view on the line 12—12 of Figure 1.

Referring more specifically to the structural details of our invention, the numeral 1 designates the frame and rear wheels of a tractor, which may be of any suitable type. At the rear end of the tractor a transversely extending socket 2 is attached by means of the bracket arms 3 and 4. This socket is adapted to receive a coupling frame 5, which is secured therein by the clamps 6 and 7. This coupling frame is provided with a centrally longitudinally extended bearing 8, through its rear side, and an aligned bearing 9 in its front side which projects into the opening 10 in the frame of the socket 2. A kingbolt 11 extends through the bearings 8 and 9, and has a head 12 at its rear end. A plow supporting frame 13 is provided with a central collar 14 which is secured on the kingbolt between the head thereof, and the bearing 8 in the coupling frame 5.

For the purpose of maintaining the plow supporting frame closely in engagement with the coupling frame, the kingbolt 11 is surrounded by a stiff coil spring 15 which abuts against the bearing member 8 and a washer 16 which is retained on the kingbolt by the pin 17. By this means the coupling frame is held firmly seated in the socket 2 and the plow supporting frame is held firmly in the coupling frame against lateral thrust. The spring 15 permits a limited amount of play when the plows strike stones, or other obstuctions.

In order to permit a limited movement about the kingbolt to compensate for irregularities in the surface of the ground, the supporting frame 14 is not held rigidly to the coupling frame, but is allowed to tilt laterally about the kingbolt.

Allowance is made for this movement by providing the guides 18 and 19 in which the forward side of the frame 13 is guided.

A draw bar 20 is mounted on the kingbolt 11 between the head thereof and the collar 14, and has a floating support thereon, as shown at 21 in Figure 9. The draw bar and the plow beams which are attached thereto, are supported by the frame 13 and may be vertically adjusted thereon for varying the depth at which the plows are operated. For the purpose of providing this vertical adjustable support, an underslung hanger bar 22 is secured to the frame 13, and a transverse diagonal bar 13$^a$ is provided on which the plow beams are supported. On these bars 22 and 13$^a$ are provided pairs of spaced sleeves 23, 24 and 25 in which the spindles 26, 27 and 28 are threaded. On these spindles between the sleeves are keyed the beveled gears 29, 30 and 31. These threaded spindles form a three point suspension for the draw bar and the bar which carries the plow beams and may be adjusted vertically by simultaneously rotating the beveled gears 29, 30 and 31. These gears are connected for simultaneous movement by the shafts 32 and 33, which are geared thereto and rotated by means of the hand wheel 34. The plow beams 36, 37 and 38 are secured to the spacing bar 35, which is located above the diagonal bar 13$^a$ and supported by the spindles 24 and 25. The plow beams are pivoted at their forward ends to the draw bar 20, which, as explained above, is vertically adjusted simultaneously with the bar 35. The plows 39, 40 and 41 are carried at the rear ends of the plow beams.

We have, in the present case, shown three plows, but this number may be varied, if desired. A guide wheel 42 is pivotally mounted on the rear end of the plow beam 38, and runs in the last furrow next to the landside.

For the purpose of supporting the front end of the frame 13, and the coupling frame when the same is disconnected from the tractor, we provide arms 43 which carry the rollers 44 at their outer ends, and are pivotally supported on the coupling frame. During the operation of the plowing, these arms are held in horizontal position by the pin 45, as indicated in Figures 1 and 2. When it is desired to disconnect the plows and support the forward end of the frame these arms 43 are swung downwardly so that the rollers 44 engage the ground and the pins 45 may be inserted in the holes 45$^a$.

For the purpose of raising the plows out of the ground for transportation from one field to another, the plow beams may be swung up about their pivotal connection on the draw bar 20 by means of the pitman 46, which is pivotally connected to the eye 47 on the diagonal spacing bar 35. In this operation, the bar 35 and the plow beams are guided by the lateral guide bars 48 and 49. This movement of the pitman 46 is effected by mechanism which is driven from the motor of the tractor, the structure of which will be hereinafter described.

Since the plow beam 38 and plow 41 are heavier than the beam and plow on the other side, there would be a tendency when the pitman 46 is operated for the draw bar 20 to swing downwardly to the left about the kingbolt 11. In order to prevent this a threaded spindle 50 is provided which is adjustable in the bracket 51 as shown in Figure 9 to support the left hand end of the draw bar. The power for lifting the draw bar is taken from the pulley 52 which is connected to the motor independently of the tractor driving mechanism. This pulley has a driving pinion 53 connected therewith which drives the spur gear 54 which is loosely mounted on the shaft 55 supported in bearings 55$^a$ and 55$^b$ on the frame of the tractor. When the gear is clutched to the shaft 55 so as to rotate the same, the crank disk 56 which is mounted on the shaft is rotated, and this crank disk carries the wrist pin 57 which is pivotally connected to the forward end of the pitman 46. The spur gear 54 may be clutched to the shaft 55 by means of the friction clutch 67, which is operated by means of the pedal 58. The pedal 58 is connected by the link 59 with the bell crank 60 pivotally mounted on the spindle 61. The opposite end of the bell crank is provided with a fork 62 which engages the lower end of an arm 63 which is secured to a shaft 64 journaled in the bearing 65 on the frame of the tractor. Arms 66 are also secured on the shaft 64 and are operatively connected at their outer ends with the clutch 67. Consequently when the pedal 58 is depressed, the shaft 64 is rocked and the arms 66 carry the clutch 67 into engagement with the gear 54, thus connecting the same with the shaft 55 to rotate the crank disk and raise or lower the plows.

We have also provided means for automatically disengaging the clutch whenever the plows have reached the limit of their movement in either direction. This means comprises the arms 68 and 69 which are secured on the rock shaft 64 and are pivotally connected to one end of the links 70 and 71. The links are connected at their opposite end to the arms 72 and 73. The shaft 55 carries a cam 74, which during its rotation engages the ends of the arms 72 and 73. When the pedal 58 is depressed therefore the shaft 55 starting from the position shown in Figure 6 will be rotated one-half of a revolution until it strikes the end of the arm 72. This will raise the link 70 which will rock the shaft 64 in the opposite direction and disengage the clutch 67.

When the clutch is disengaged the gear 54 and the shaft 55 and the crank disk 56 will be free to rotate and the weight of the plows would cause the same to gravitate to their lower position unless means were provided to prevent it. We have, therefore, provided a notch 75 in the periphery of the crank disk, and when the plows have reached their uppermost position and the clutch becomes disengaged the pawl 76 will have dropped into the notch 75 and thus prevent the disk from moving backwardly when the clutch is disengaged.

At this point in the rotation of the disk, the wrist pin will be a little short of dead center so that the weight of the plows will be exerted in a backward direction against the pawl 76. In the position shown in Figure 2, it is unnecessary to provide any means for securing the crank disk 56 against rotation since the weight of the plows will hold them in their lowest position.

It sometimes happens in plowing fields in which there are many large rocks or other obstructions, that the plows might be broken unless means were provided for permitting them to be thrown out. We have, therefore, constructed the pitman 46 in two sections pivoted together at 77, the pivotal point being slightly above the straight line between the wrist pin and the eye 47. The eye connection 78 is also provided and under ordinary conditions a pin will be inserted through the eye 78 and the pitman will be held rigidly in its position. In especially rough plowing, however, it may be found advisable to omit the pin from the eye 78 and when an extreme pressure is exerted upon the plows the pitman will jackknife and allow the plows to swing upwardly.

From the foregoing description it will be seen that we have constructed an efficient and practical device, which is adapted for use under any of the various conditions which may be encountered in plowing.

While we have shown and described in detail one form in which our invention may be embodied, it will be understood that various changes and modifications may be made therein without departing from the spirit of the invention as claimed.

We claim as our invention:

The combination of a tractor, a substantially horizontal coupling frame secured thereto, a substantially horizontal kingbolt carried by said coupling frame, a plow supporting frame pivotally carried by said kingbolt and having sliding connection with said coupling frame, a draw bar pivotally carried by said king bolt, a plurality of plow beams pivotally joined to said draw bar and extending rearwardly, a single guider wheel carried by an outer plow beam, a plow carried by each plow beam, and adjusting means carried by said plow supporting frame for simultaneously adjusting said plow beams and said draw bar.

In testimony that we claim the foregoing we have hereunto set our hands at Milwaukee, in the county of Milwaukee and State of Wisconsin.

CHARLES S. HENTZELL.
MILLARD P. HENTZELL.